Aug. 4, 1931.  P. B. SHEE  1,817,464

SEPARATOR

Filed April 5, 1930

Inventor:
Parke B. Shee
By Churchill Parker Carlson
Attys

Patented Aug. 4, 1931

1,817,464

UNITED STATES PATENT OFFICE

PARKE B. SHEE, OF OAK PARK, ILLINOIS, ASSIGNOR TO SEARS, ROEBUCK AND CO., OF CHICAGO, ILLINOIS, A CORPORATION OF NEW YORK

SEPARATOR

Application filed April 5, 1930. Serial No. 441,787.

The invention relates generally to a centrifugal separator and more particularly to a bowl assembly for such a separator.

The general object of the invention is to provide a novel bowl assembly comprising a bowl and bowl cover having great stiffness and rigidity and capable of withstanding without distortion the stress placed thereon when they are assembled and rotated at a high speed.

Another object is to provide such a bowl assembly in which the bowl and bowl cover are securely sealed together when assembled to prevent any leakage of liquid when the assembly is rotated at high speed.

A further object is to provide such a bowl assembly, in which the cover permits of easy attachment of balancing weights.

Other objects and advantages will become apparent from the following description taken in connection with the accompanying drawings, in which.

Figure 1:
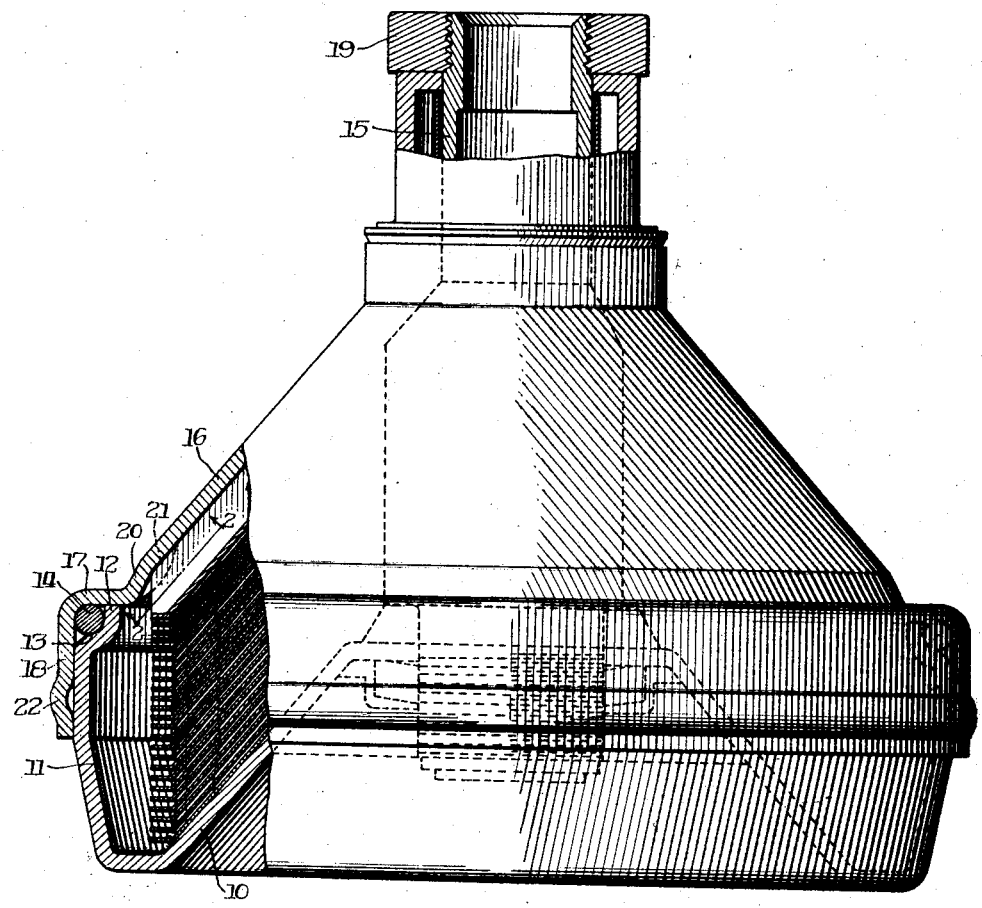
Figure 1 is an elevational view partly in section of a bowl assembly embodying the features of the invention.
Figure 2:
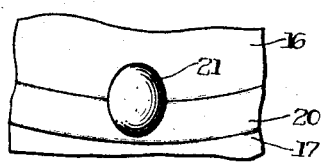
Fig. 2 is a fragmentary view taken along the line 2—2 of Fig. 1.

While the invention is susceptible of various modifications and alternate constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In a centrifugal separator, a bowl assembly is provided which is adapted to be seated upon the upper end of a drive shaft and to be rotated at a relatively high speed thereby. Unseparated liquid is introduced into the bowl assembly, wherein the separation takes place.

The bowl assembly comprises in general a bowl and a bowl cover which are clamped together by means exerting an axial pressure. Sealing means are provided between the bowl and cover to prevent leakage of the liquid from the assembly when it is rotated at the high speed imparted by the drive shaft.

As illustrated in the drawings, the bowl comprises a bottom 10 and a substantially cylindrical side 11 having a rim 12 which is turned inwardly and then upwardly to form a shoulder 13. An annular gasket 14 made of rubber or the like and having a circular cross-section rests on the shoulder 13. A stem 15 is fixed to the bottom 10 of the bowl and projects centrally upward therefrom.

The bowl cover comprises a conical section 16 and a flange 17 extending outwardly from the conical section 16 and seated upon the rim 12 of the bowl and upon the gasket 14. A skirt 18 extends downwardly from the flange 17 and surrounds the rim 12, the gasket 14, and the side wall 11.

The bowl and bowl cover are clamped together by means applying axial pressure, which comprises a nut 19 threaded to the top of the stem 15 and abutting the upper end of the cover.

To prevent distortion of the cover when it is clamped to the bowl and rotated at a high speed, an annular rib 20 is formed in the cover by bending inwardly the lower portion of the conical section 16 adjacent the flange 17, which rib stiffens the cover and causes it to bear tightly against the rim 12. The rib 20 thus forms an internal annular groove with the conical section 16 in which weights 21 for balancing may be placed at the required points about the circle.

The skirt 18 also has an annular rib 22 to stiffen it and to prevent distortion by the pressure of clamping and of rotation.

From the above description, it is apparent that I have provided a novel bowl assembly having great stiffness and rigidity and capable of withstanding without distortion the stress placed thereon by the clamping and the rotation. It is also apparent that I have provided a bowl assembly in which the bowl and cover are securely sealed together, and in which the cover permits of easy attachment of balancing weights.

I claim as my invention:

1. In a centrifugal separator, a bowl assembly comprising, in combination, a bowl having a rim, a stem projecting centrally upward from the bottom of said bowl, a cover having a conical section and a flange extending radially outward therefrom seated on the rim of said bowl, and a nut threaded to said stem and clamping said cover against the rim of the bowl, said cover having a rib formed by bending inward to a diameter less than the diameter of the rim of the bowl the end of the conical section adjoining said flange to stiffen said cover and to cause said flange to bear tightly against the rim of the bowl when clamped by said nut.

2. In a centrifugal separator, a bowl cover having a conical section, an annular flange at the larger end of said conical section constructed to bear against the bowl, and an inwardly turned annular rib between said flange and said conical section, said rib forming an annular groove with said conical section closely adjacent said flange in which weights for balancing may be placed.

3. In a centrifugal separator, the combination of a bowl having a substantially cylindrical side, the rim of which is turned inwardly and then upwardly to form a shoulder, a gasket fitting on said shoulder, a bowl cover comprising a conical section, a flange extending outwardly from said conical section and seated upon said rim and said gasket, and a downwardly extending skirt surrounding the rim of said bowl and the gasket, and means for clamping said cover and said bowl together by axially applied pressure, said conical section having an annular stiffening rib adjacent said flange, and said skirt having an annular stiffening rib intermediate its ends, said ribs being adapted to prevent distortion of the portions of said cover which bear on said bowl when the former is clamped to said bowl.

In testimony whereof, I have hereunto affixed my signature.

PARKE B. SHEE.